United States Patent
Jadhav et al.

(10) Patent No.: US 10,179,551 B2
(45) Date of Patent: Jan. 15, 2019

(54) SLIDING JOINT APPLIQUE

(71) Applicant: FORD GLOBAL TECHNOLOGIES, LLC, Dearborn, MI (US)

(72) Inventors: Nitesh Chandrakant Jadhav, Canton, MI (US); Bill Moore Sherwood, Royal Oak, MI (US); Mirza Safder Ali Baig, Canton, MI (US); Bhavani Thota, Novi, MI (US); Linh Doan, Belleville, MI (US); Tyler Glenn, Ypsilanti, MI (US)

(73) Assignee: Ford Global Technologies LLC, Dearborn, MI (US)

( * ) Notice: Subject to any disclaimer, the term of this patent is extended or adjusted under 35 U.S.C. 154(b) by 312 days.

(21) Appl. No.: 15/133,984

(22) Filed: Apr. 20, 2016

(65) Prior Publication Data
US 2017/0305364 A1 Oct. 26, 2017

(51) Int. Cl.
*B60R 13/02* (2006.01)

(52) U.S. Cl.
CPC ...... *B60R 13/0206* (2013.01); *B60R 13/0243* (2013.01); *B60R 2013/0287* (2013.01)

(58) Field of Classification Search
CPC ............ B60R 12/0206; B60R 12/0243; B60R 13/0206; B60R 13/0243
USPC ................................... 296/39.1, 146.7, 1.08
See application file for complete search history.

(56) References Cited

U.S. PATENT DOCUMENTS

| | | | | |
|---|---|---|---|---|
| 1,316,952 A | * | 9/1919 | Heydon | B60R 13/0206 403/13 |
| 1,820,064 A | * | 8/1931 | Green | B60R 13/0206 411/103 |
| 1,938,871 A | * | 12/1933 | Smith | B60R 13/02 24/295 |
| 1,972,412 A | * | 9/1934 | van Dresser | B60R 13/02 24/289 |
| 2,033,448 A | * | 3/1936 | Rodack | B60R 13/0206 24/296 |

(Continued)

FOREIGN PATENT DOCUMENTS

| | | | |
|---|---|---|---|
| DE | 10125987 A1 | 12/2002 | |
| JP | 09277830 A | * 10/1997 | ............ B60J 5/0416 |

(Continued)

OTHER PUBLICATIONS

English Machine Translation of DE10125987.

(Continued)

*Primary Examiner* — Dennis H Pedder
(74) *Attorney, Agent, or Firm* — Vichit Chea; King & Schickli PLLC

(57) ABSTRACT

A composite applique assembly for a vehicle interior trim piece includes a flexible receiver element and a flexible insert connected to the flexible receiver element by a sliding joint. An end of the flexible receiver element is fixedly connected to a vehicle door element. An end of the flexible insert opposite to the flexible receiver element end is fixedly connected to a vehicle door element. The flexible receiver element defines an internal channel configured for slidingly receiving the flexible insert therein. The flexible receiver element further defines at least a partial-length slot providing fluid communication with the internal channel.

16 Claims, 5 Drawing Sheets

(56) References Cited

U.S. PATENT DOCUMENTS

| | | | |
|---|---|---|---|
| 2,051,673 A * | 8/1936 | Ball | B60R 13/0206 24/295 |
| 4,667,979 A * | 5/1987 | Wolff | B60R 11/0217 180/90 |
| 5,037,687 A * | 8/1991 | Kargarzadeh et al. | B29C 33/02 428/158 |
| 5,810,418 A * | 9/1998 | Stenger et al. | B60R 13/0206 296/72 |
| 6,308,488 B1 * | 10/2001 | Hoshino | B60R 13/0206 296/146.7 |
| 6,929,309 B1 * | 8/2005 | Radu et al. | B60R 13/0243 296/146.7 |
| 7,104,590 B2 | 9/2006 | Dooley et al. | |
| 7,261,364 B2 * | 8/2007 | Tanigawa | B60J 5/06 296/155 |
| 7,410,206 B2 * | 8/2008 | Koarai | F16B 5/0664 296/1.08 |
| 8,801,032 B2 * | 8/2014 | Sadr et al. | B60R 21/13 280/730.2 |
| 8,979,156 B2 * | 3/2015 | Mally | F16B 5/0657 24/297 |
| 9,457,735 B2 * | 10/2016 | Migaki | B60R 13/0206 |
| 2005/0229514 A1 * | 10/2005 | Nakao et al. | B60R 13/0206 52/288.1 |
| 2006/0001291 A1 * | 1/2006 | Dooley et al. | B60R 13/0206 296/153 |
| 2008/0116722 A1 * | 5/2008 | Garcia Martin et al. | B60J 5/0416 296/208 |
| 2008/0251667 A1 * | 10/2008 | Swayne et al. | B60R 13/0206 248/220.31 |
| 2009/0183436 A1 | 7/2009 | Dry | |
| 2009/0199480 A1 * | 8/2009 | Ehrhard | B60J 5/0412 49/212 |
| 2013/0140846 A1 * | 6/2013 | Montoya et al. | B60R 13/0243 296/146.7 |
| 2015/0232131 A1 * | 8/2015 | Morris et al. | F16B 5/06 403/14 |
| 2015/0291069 A1 * | 10/2015 | Jayasuriya et al. | B60N 2/466 296/153 |
| 2015/0375799 A1 * | 12/2015 | Morris et al. | B60R 13/02 403/14 |
| 2017/0106811 A1 * | 4/2017 | Dublan et al. | B60R 13/0206 |
| 2017/0113633 A1 * | 4/2017 | Yamato et al. | B60R 13/0243 |
| 2017/0305363 A1 * | 10/2017 | Jadhav et al. | B60R 13/0243 |

FOREIGN PATENT DOCUMENTS

| | | | |
|---|---|---|---|
| JP | 09277830 A * | 10/1997 | B60J 5/04 |
| JP | 2010264849 A | 11/2010 | |
| KR | 100560610 B1 | 3/2006 | |
| KR | 100566656 B1 | 3/2006 | |
| KR | 20060026196 A | 3/2006 | |
| KR | 20110096299 A | 8/2011 | |
| KR | 101130513 B1 | 3/2012 | |

OTHER PUBLICATIONS

English Machine Translation of JP2010264849A.
English Machine Translation of KR100560610B1.
English Machine Translation of KR100566656B1.
English Machine Translation of KR101130513B1.
English Machine Translation of KR20060026196A.
English Machine Translation of KR20110096299A.
Office Action dated Mar. 27, 2017 regarding U.S. Appl. No. 15/133,928, filed Apr. 20, 2016.
Notice of Allowance dated Apr. 10, 2018 for U.S. Appl. No. 15/133,928, filed Apr. 20, 2016.
Corrected Notice of Allowability dated Jun. 13, 2018 for U.S. Appl. No. 15/133,928, filed Apr. 20, 2016.

* cited by examiner

SLIDING JOINT APPLIQUE

TECHNICAL FIELD

This disclosure relates generally to vehicle trim pieces and trim packages. In particular, the disclosure relates to a composite applique piece for a vehicle trim piece which resolves separation issues in the event of a side impact, especially side-pole impact.

BACKGROUND

Certain regulatory, industry, and manufacturer standards have been established regarding post-impact interior component separation. For example, European regulations relating to side impacts specify that "no interior device or component shall become detached in such a way as noticeably to increase the risk of injury to the occupant from sharp projections or jagged edges." Likewise, certain manufacturer side impact standards require "no interior aggressive edges to be present post impact." Various controlled impact tests have been developed to evaluate compliance with such regulatory, industry, and manufacturer standards. A representative example of a regulatory side-pole test is the FMVSS 214 Vehicle-to-Pole test, wherein a laterally moving vehicle impacts a rigid pole at 20 miles per hour. In this test, the vehicle is propelled laterally so that its line of forward motion forms an angle of 75 degrees with the longitudinal centerline of the vehicle.

Interior trim pieces such as decorative applique pieces pose a particular concern because such trim pieces, not being integral with other vehicle interior components, may break and/or detach post-impact and present sharp projections/jagged edges. There is accordingly a need in the art for interior applique pieces which reduce or eliminate this risk.

To address this identified need, the present disclosure relates to a composite applique assembly for vehicle interior trim. Advantageously, the described applique assembly defines a sliding joint which reduces or eliminates the tendency of the applique piece to fracture on impact. This likewise reduces or eliminates the tendency of the applique piece to present a sharp edge or jagged projection post-impact.

SUMMARY

In accordance with the purposes and benefits described herein, in one aspect a composite applique assembly for a vehicle interior trim piece is provided, comprising a flexible receiver element and a flexible insert connected to the flexible receiver element by a sliding joint. In use, an end of the flexible receiver element is fixedly connected to a vehicle door element. Likewise, an end of the flexible insert opposite to the flexible receiver element end is fixedly connected to a vehicle door element. Optionally, one or more frangible fasteners may releasably connect the flexible receiver element and the flexible insert. The flexible receiver element defines an internal channel configured for slidingly receiving the flexible insert therein. The flexible receiver element further defines one or more slots defined along a longitudinal axis thereof.

In embodiments, the sliding joint comprises a sliding mechanical fastener attached to the flexible insert and engaging the one or more slots. In embodiments, the sliding joint comprises a flexible insert flange slidingly engaging the one or more slots.

In another aspect, an interior trim assembly for a vehicle is described, comprising a vehicle interior substrate and a composite applique assembly substantially as described above.

In the following description, there are shown and described embodiments of the disclosed composite applique assembly and of trim piece packages including the applique assembly. As it should be realized, the device is capable of other, different embodiments and its several details are capable of modification in various, obvious aspects all without departing from the devices as set forth and described in the following claims. Accordingly, the drawings and descriptions should be regarded as illustrative in nature and not as restrictive.

BRIEF DESCRIPTION OF THE DRAWINGS

The accompanying drawing figures incorporated herein and forming a part of the specification, illustrate several aspects of the disclosed composite applique assembly, and together with the description serve to explain certain principles thereof. In the drawings.

Reference will now be made in detail to embodiments of the disclosed composite applique assembly and trim pieces incorporating same, examples of which are illustrated in the accompanying drawing figures.

DETAILED DESCRIPTION

Preliminarily, the present disclosure describes a composite applique assembly primarily in the context of application to a vehicle door interior trim piece, intended to reduce a tendency of conventional applique pieces to produce sharp edges/jagged projections on side impact as summarized above. However, the skilled artisan will appreciate that the disclosed sliding-joint applique piece and interior trim pieces incorporating same are readily adaptable to other interior trim locations and impact locations. Accordingly, the present descriptions should not be taken as limiting in that regard.

As summarized above, interior trim pieces such as decorative applique pieces pose a particular concern because such trim pieces, not being integral with other vehicle interior components, may break and/or detach post-impact and present sharp projections/jagged edges. As an example, consider the case of an applique piece attached to a door trim top-roll by conventional fasteners such as heat stakes, PAL-NUTs® (which as is known are locking devices including a series of barbs for locking a nut in place on a bolt), or other such fasteners. On receiving an exterior side impact to the door the applique bends. As the impacting device (for example a pole) continues to intrude into the vehicle door structure, the applique undergoes bending and tensile stresses. Eventually, tensile and shear stresses cause the fasteners to break, releasing the applique piece and potentially allowing an end of the applique to protrude into the vehicle passenger cabin.

Prior art means to overcome this applique separation phenomenon include additional fastening means such as end-mounted hooks to try to prevent applique separation. However, it has been shown that side impact tests such as the vehicle-to-pole side impact test, which as summarized above provides a 20 mph oblique side impact, are too severe for such fasteners and so applique separation still occurs. Other attempts to overcome applique separation include providing predefined weakenings of the applique structure, for example one or more v-grooves or semicircular grooves defined in a portion of the material of the applique that is not within a vehicle occupant zone. Such predefined weakenings are intended to encourage breakage/separation of the applique in a defined and controlled manner away from the occupant zone post-impact. However, because these solutions still allow breakage of the applique, the potential still exists for sharp/jagged edges protruding into the vehicle passenger cabin post-impact. Thus, a need exists for a more robust solution.

Figure 1:
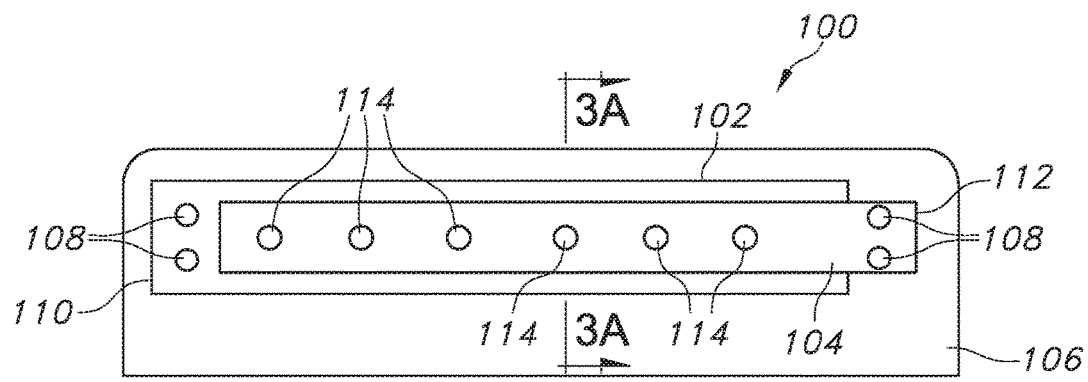
FIG. 1 shows a side view of a composite applique assembly according to the present disclosure.

To solve this and other problems, with reference to FIG. 1 there is provided a composite applique assembly 100 comprising a flexible receiver element 102 and a flexible insert 104. In embodiments, each of the flexible receiver element 102 and flexible insert 104 are manufactured of a suitably flexible material, for example a ductile plastic, wood and metal such as aluminum and stainless steel and any other interior decorative appliques. As will be appreciated, by fabricating each of the flexible receiver element 102 and flexible insert 104 of a flexible material such as ductile plastic, on receipt of an impact the composite applique assembly 100 will bend and flex rather than breaking, reducing the likelihood of producing sharp, jagged edges post-impact.

The flexible receiver element 102 and flexible insert 104 are each secured to a vehicle element 106, for example to a vehicle door trim piece, by suitable mechanical fasteners 108. As shown the flexible receiver element 102 is secured to the vehicle element 106 on an end 110 thereof. In turn, the flexible insert 104 is secured to the vehicle element 106 on an end 112 thereof. As shown, ends 110 and 112 are opposite to one another.

Optionally, one or more frangible fasteners 114 disposed between the ends 110, 112 may secure the flexible receiver element 102 to the flexible insert 104. This beneficially reduces issues of noise, such as rattling of the flexible insert 104 within the flexible receiver element 102 during vehicle operation. The frangible fasteners 114 may be shear pins of substantially conventional construction. It will be appreciated that the need or desirability of such frangible fasteners 114 may be determined by various physical properties of the applique assembly 100. For example, applique assemblies 100 defining a short longitudinal length may not require such additional fastening. Likewise, flexible receiver elements 102 and/or flexible inserts 104 that are fabricated of very soft, malleable materials may not create issues of noise even without additional fastening.

Figure 2A:
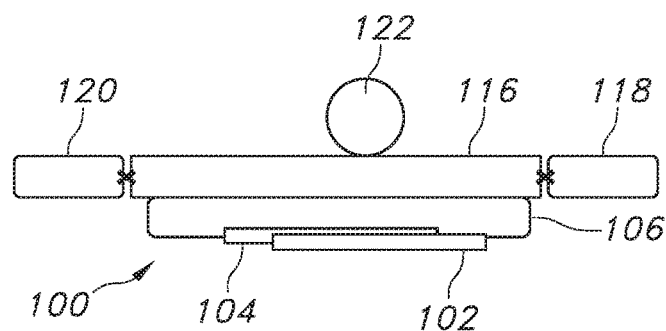
FIG. 2A shows the top view composite applique assembly of FIG. 1 prior to a side-pole impact.
Figure 2B:
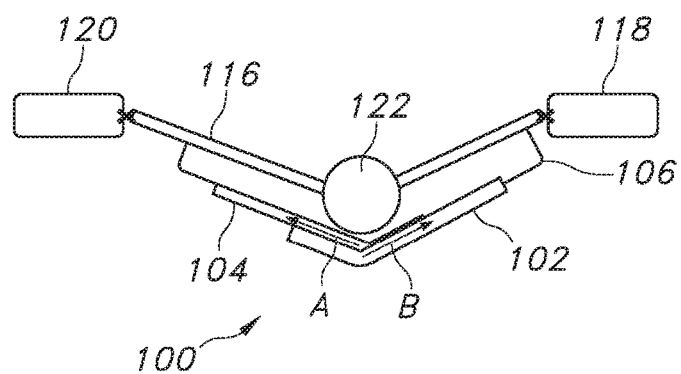
FIG. 2B shows the composite applique assembly of FIG. 2A after a side-pole impact.

As will be appreciated, the above-described arrangement allows a sliding relationship between the flexible receiver element 102 and the flexible insert 104. With reference to FIGS. 2A-2B, the applique assembly 100 is shown attached to a substrate 106, being a door trim piece attached to a vehicle door structure 116 disposed between a vehicle A pillar 118 and a B-pillar 120. As shown, the flexible receiver element 102 and flexible insert 104 are strongly and separately attached to the substrate 106 but are otherwise either separate from one another or at most releasably attached to one another by frangible fasteners 114. On receipt of an oblique side impact from a pole 122, as the pole intrudes into the door structure 116 the flexible receiver element 102 and flexible insert 104 displace in opposite directions relative to one another (arrows A, B). If present, the optional frangible fasteners 114 will break on application of sufficient tensile and shear stress. Thus, a sliding joint is provided between the flexible receiver element 102 and flexible insert 104, allowing sufficient relative movement between the two to prevent a break but also preventing separation of the two.

Figure 2C:
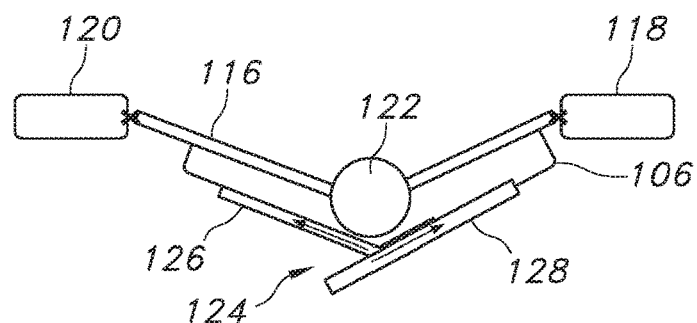
FIG. 2C shows a prior art applique assembly after side-pole impact.

Contrast this to a prior art applique 124 comprising a bezel 126 and applique plate 128 (FIG. 2C). As shown, because the bezel 126 and applique plate 128 are neither flexible nor slidable relative to one another, as the side impacting pole 122 intrudes into the door 116 structure, the applique plate 128 separates from the bezel 126, presenting a sharp applique plate corner.

A number of embodiments of sliding joints slidingly connecting the flexible receiver element 102 and the flexible insert 104 are contemplated. With reference to FIG. 3A-3F, in embodiments the flexible receiver element 102 defines an interior channel 300 within which a substantially planar flexible insert 104 is received. A window 302 is defined in a portion of the flexible receiver element 104 through which the flexible insert 104 may be visualized. The flexible insert 102 is retained by flexible receiver element flanges 304.

In an alternative embodiment (see FIG. 3B), a flexible insert 104 is provided defining a substantially C-shaped cross-section and including flanges 306 which slidingly engage opposed cooperating flexible receiver element 102 longitudinal slots 308.

In another alternative embodiment (see FIG. 3C) a flexible insert 104 is provided including a flange 312 defining a substantially T-shaped cross-section which slidingly engages a cooperating flexible receiver element 102 longitudinal slot 310.

Figure 3A:
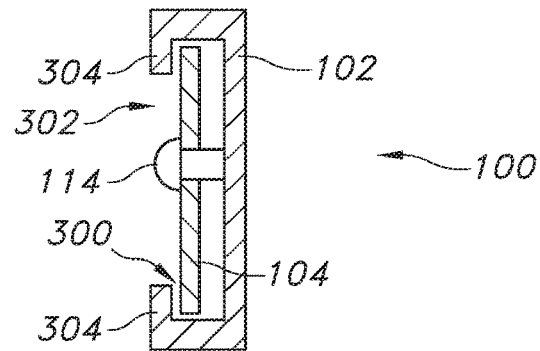
FIG. 3A shows a side cross-sectional view of an embodiment of a sliding joint for a composite applique assembly according to the present disclosure.
Figure 3B:
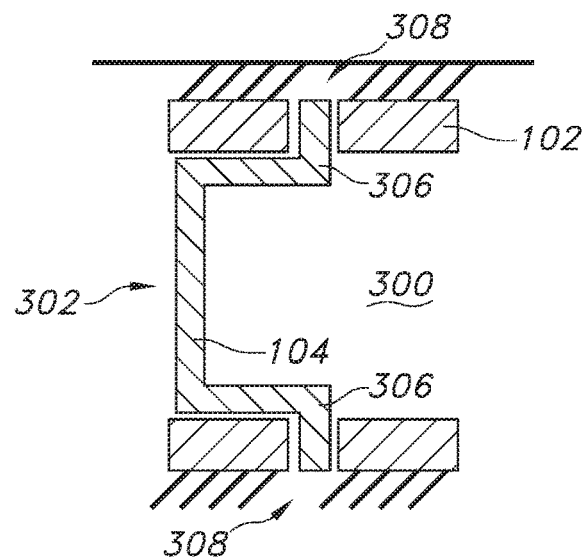
FIG. 3B shows a side cross-sectional view of an alternative embodiment of a sliding joint for a composite applique assembly according to the present disclosure.
Figure 3C:
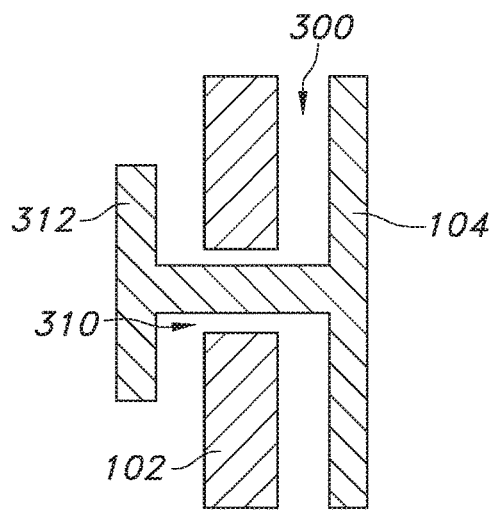
FIG. 3C shows a side cross-sectional view of another alternative embodiment of a sliding joint for a composite applique assembly according to the present disclosure.
Figure 3D:
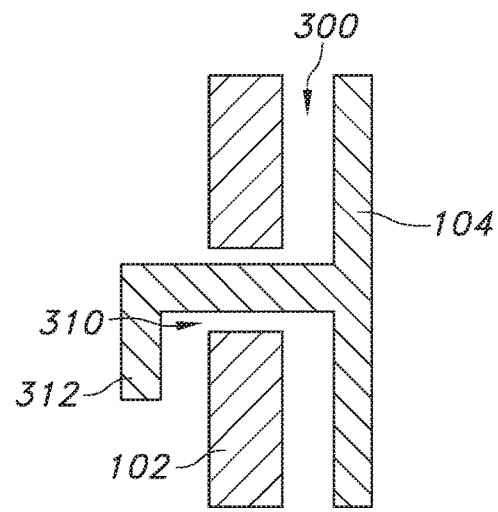
FIG. 3D shows a side cross-sectional view of yet another alternative embodiment of a sliding joint for a composite applique assembly according to the present disclosure.
Figure 3E:
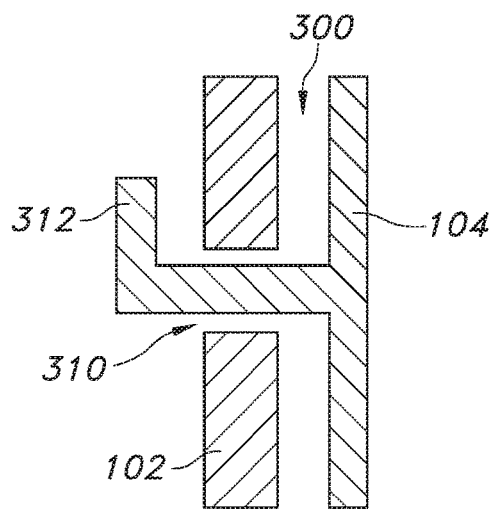
FIG. 3E shows a side cross-sectional view of still another alternative embodiment of a sliding joint for a composite applique assembly according to the present disclosure.
Figure 3F:
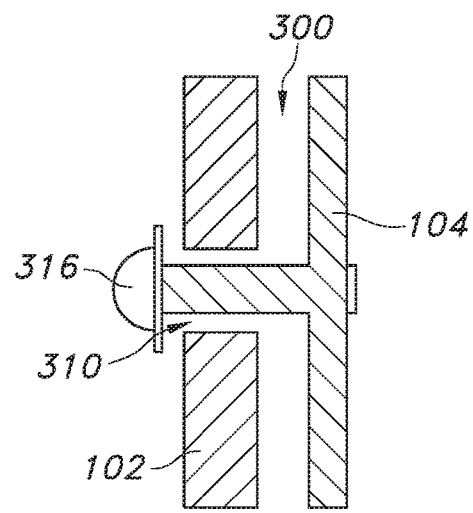
FIG. 3F shows a side cross-sectional view of still yet another alternative embodiment of a sliding joint for a composite applique assembly according to the present disclosure.

In yet another alternative embodiment (see FIG. 3D) a flexible insert 104 is provided including a flange 312 defining a substantially L- or hook-shaped cross-section which slidingly engages the cooperating flexible receiver element 102 longitudinal slot 310. The flange 312 may be oriented vehicle-downwardly (FIG. 3D) or vehicle-upwardly (FIG. 3E).

In still yet another alternative embodiment (see FIG. 3F) a sliding joint is provided by slidably securing a flexible insert 104 to a flexible receiver element 102 by a mechanical fastener 316 which slidingly engages the cooperating flexible receiver element 102 longitudinal slot 310. Use of any suitable fastener providing a sliding joint arrangement as described is contemplated, including without intending any limitation a nut and bolt, a nut, bolt, and washer, a PAL-NUT®, a nut, bolt, and lockwasher, a locknut and bolt, and others.

In yet another alternative embodiment, it is contemplated to provide a composite applique assembly which comprises a sliding joint element, but which also is configured to allow a controlled separation of the flexible receiver element and the flexible insert at need. With reference to FIGS. 4A-4D, in this embodiment a composite applique assembly 400 comprises a flexible receiver element 402 and a flexible insert 404. In embodiments, each of the flexible receiver element 402 and flexible insert 404 are manufactured of a suitably flexible material, for example a ductile plastic, wood and metal such as aluminum and stainless steel and any other interior decorative appliques. As will be appreciated, by fabricating each of the flexible receiver element 402 and flexible insert 404 of a flexible material such as ductile plastic, on receipt of an impact the composite applique assembly 400 will bend and flex rather than breaking, reducing the likelihood of producing sharp, jagged edges post-impact.

The flexible receiver element 402 and flexible insert 404 are each secured to a vehicle element 406, for example to a vehicle door trim piece, by suitable mechanical fasteners 408. As shown the flexible receiver element 402 is secured to the vehicle element 406 on an end 410 thereof. In turn, the flexible insert 404 is secured to the vehicle element 406 on an end 412 thereof. As shown, ends 410 and 412 are opposite to one another. Optionally, one or more frangible fasteners (not shown) disposed between the ends 410, 412 may secure the flexible receiver element 402 to the flexible insert 404. As for other embodiments discussed above, the above-described arrangement allows a sliding relationship between the flexible receiver element 402 and the flexible insert 404. In this embodiment, the sliding joint is defined as a stopped sliding joint by providing a key slot 414 comprising a first slot portion 416 and a second slot portion 418. As shown, the second slot portion 418 defines a width dimension that is less than a width dimension of the first slot portion 416.

Figure 4A:
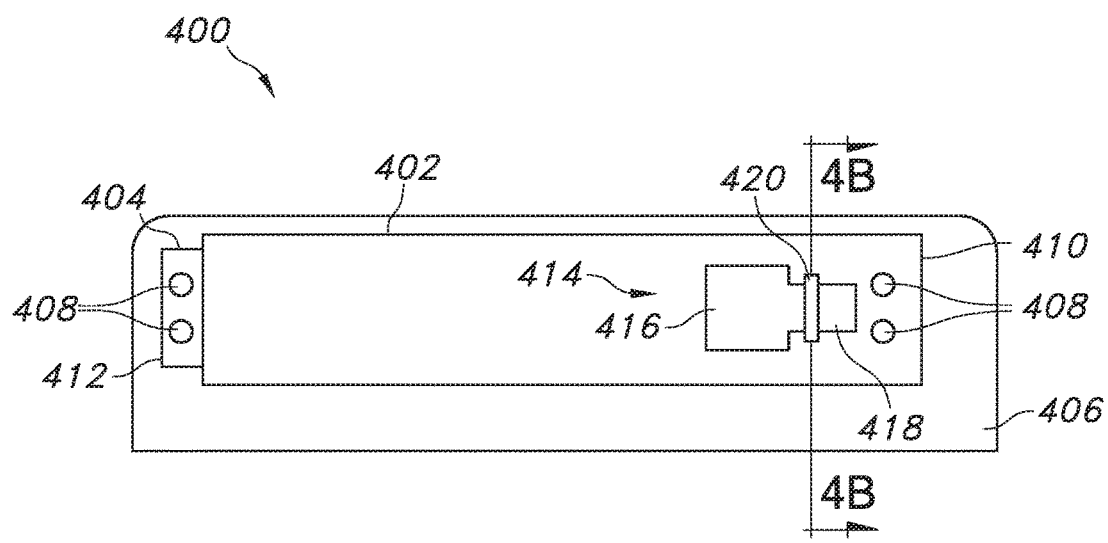
FIG. 4A shows a side view of an alternative embodiment of a composite applique assembly according to the present disclosure.
Figure 4B:
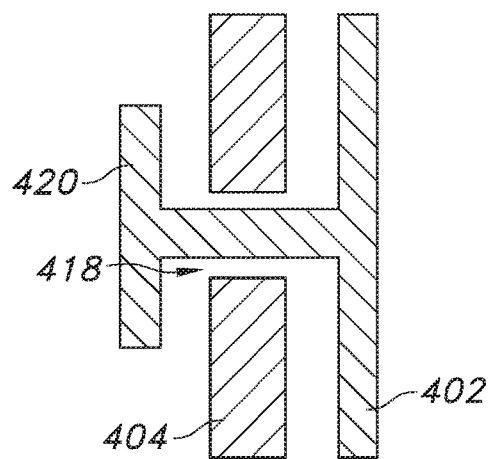
FIG. 4B shows a side cross-sectional view of a stopped sliding joint for the composite applique assembly of FIG. 4A.

As shown in FIG. 4B, the flexible insert 404 includes a flange 420 which slidingly engages the second slot portion 418. The depicted embodiment illustrates a flange 420 defining a substantially T-shaped cross-section which slidingly engages the second slot portion 418. However, it will be appreciated that any suitable flange configuration as described above, including the L-shaped flange embodiments, the C-shaped flange embodiments, and the mechanical fasteners discussed above will serve.

As shown, the flange 420 is dimensioned to slidingly engage the second slot portion 418 but defines a lesser width dimension than the first slot portion 416. Accordingly, on separation of the flexible insert 404 and flexible receiver element 402 in opposite directions the flange 420 will retain the sliding joint arrangement as described until the flange reaches the first slot portion 416 of the key slot 414. At that point, the sliding joint engagement of the flexible receiver element 402 and flexible insert 404 will disengage, and a portion of the flexible insert 404 may separate from the flexible receiver element 402 through the first slot portion 416.

Figure 4C:
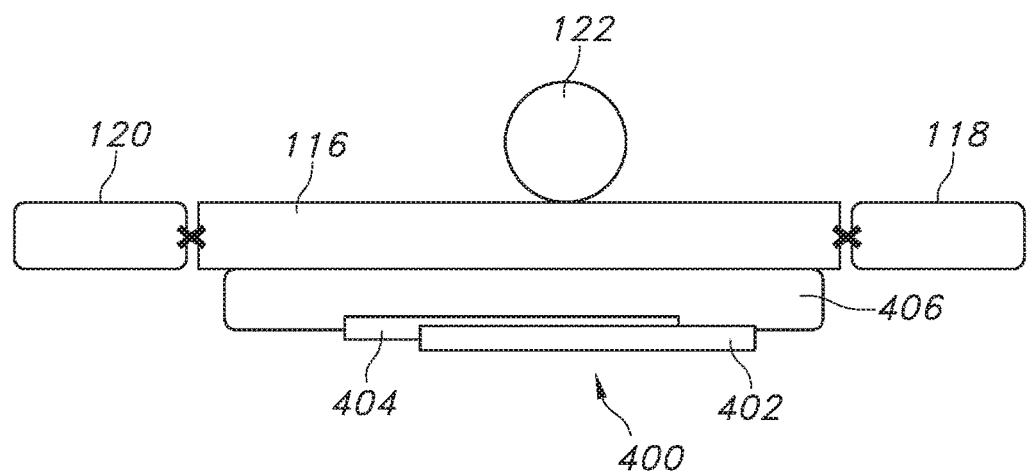
FIG. 4C shows the composite applique assembly of FIG. 4A prior to a side-pole impact.
Figure 4D:
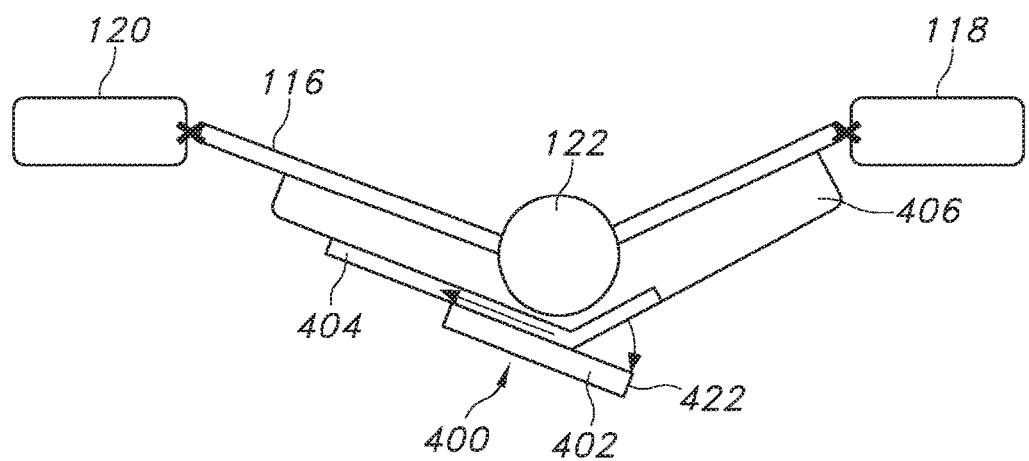
FIG. 4D shows the composite applique assembly of FIG. 4A after a side-pole impact.

Advantageously, this occurs in a controlled manner whereby: a) the risk of the flexible insert 404 having a jagged or sharp edge is minimized because the flexible insert has not been broken along any portion of its length; and b) the separation of the flexible insert from the flexible receiver element 402 is controlled. This is illustrated in FIGS. 4C-4D showing the applique assembly 400 attached to a substrate 406, again being a door trim piece attached to a vehicle door structure 116 disposed between a vehicle A pillar 118 and a B-pillar 120. As shown (FIG. 4C), the flexible receiver element 402 and flexible insert 404 are strongly and separately attached to the substrate 406 but are otherwise either separate from one another or at most releasably attached to one another by frangible fasteners.

On receipt of an oblique side impact from a pole 122 (FIG. 4D), as the pole intrudes into the door 116 structure the flexible receiver element 402 and flexible insert 404 displace in opposite directions relative to one another. When the flexible insert flange 420 reaches the first slot portion 416 as described above (not shown for convenience) a controlled separation of the flexible receiver element 402 and flexible insert 404 is effected, with the separated end 422 being oriented away from a vehicle occupant zone. Moreover, because the flexible insert 404 is sufficiently flexible to separate in a controlled manner rather than breaking due to the impact, the separated end 422 is unlikely to include a sharp or jagged edge. Thus, a stopped sliding joint is provided between the flexible receiver element 402 and flexible insert 404, allowing sufficient relative sliding movement between the two to assist in preventing a break and, for a sufficiently severe impact, providing for a controlled separation of the two.

Thus, by the above-described structures and mechanisms, composite applique assemblies for interior vehicle trim and interior trim pieces incorporating such assemblies are provided. The composite applique assemblies are robust, flexible, and meet applicable regulatory, industry, and manufacturer standards for impacts such as the side-pole impact. Advantageously, by the sliding relationship provided by the described sliding joints, the tendency of the applique pieces to present sharp, jagged edges is minimized. The assemblies are easily serviceable, easily adaptable to any vehicle configuration, and provide a high degree of tenability to accommodate various vehicle trim designs. Still more, the assemblies are simple and cost-efficient to manufacture.

Obvious modifications and variations are possible in light of the above teachings. All such modifications and variations are within the scope of the appended claims when interpreted in accordance with the breadth to which they are fairly, legally and equitably entitled.

What is claimed:
1. A composite applique assembly for a vehicle interior trim piece, comprising:
   a flexible receiver element having an end fixedly connected to a vehicle door element; and
   a flexible insert connected to the flexible receiver element by a sliding joint, wherein an end of the flexible insert opposite to the flexible receiver element end is fixedly connected to the vehicle door element.
2. The assembly of claim 1, optionally including one or more frangible fasteners releasably connecting the flexible receiver element and the flexible insert.

3. The assembly of claim 2, wherein the one or more frangible fasteners are shear pins disposed intermediate of the flexible receiver element end and the flexible insert end.

4. The assembly of claim 1, wherein the flexible receiver element defines an internal channel configured for slidingly receiving the flexible insert therein.

5. The assembly of claim 4, wherein the flexible receiver element further defines one or more slots defined along a longitudinal axis thereof.

6. The assembly of claim 5, wherein the sliding joint comprises a sliding mechanical fastener attached to the flexible insert and engaging the one or more slots.

7. The assembly of claim 5, wherein the sliding joint comprises a flexible insert flange slidingly engaging the one or more slots.

8. An interior trim assembly for a vehicle, comprising:
a vehicle interior substrate; and
a composite applique assembly for attaching to the vehicle interior substrate, comprising:
 a flexible receiver element having an end fixedly connected to a vehicle door element; and
 a flexible insert connected to the flexible receiver element by a sliding joint, wherein an end of the flexible insert opposite to the flexible receiver element end is fixedly connected to the vehicle door element.

9. The assembly of claim 8, optionally including one or more frangible fasteners releasably connecting the flexible receiver element and the flexible insert.

10. The assembly of claim 9, wherein the one or more frangible fasteners are shear pins disposed intermediate of the flexible receiver element end and the flexible insert end.

11. The assembly of claim 8, wherein the flexible receiver element defines an internal channel configured for slidingly receiving the flexible insert therein.

12. The assembly of claim 11, wherein the flexible receiver element further defines one or more slots defined along a longitudinal axis thereof.

13. The assembly of claim 12, wherein the sliding joint comprises a sliding mechanical fastener attached to the flexible insert and engaging the one or more slots.

14. The assembly of claim 12, wherein the sliding joint comprises a flexible insert flange slidingly engaging the one or more slots.

15. The assembly of claim 8, wherein the vehicle interior substrate is a door trim piece.

16. A vehicle including the assembly of claim 8.

* * * * *